United States Patent [19]

Adams

[11] Patent Number: 4,521,556

[45] Date of Patent: Jun. 4, 1985

[54] COLORED POLYESTER COMPOSITIONS

[75] Inventor: L. Jane Adams, Kingsport, Tenn.

[73] Assignee: Eastman Kodak Company, Rochester, N.Y.

[21] Appl. No.: 631,287

[22] Filed: Jul. 16, 1984

Related U.S. Application Data

[63] Continuation-in-part of Ser. No. 575,242, Jan. 30, 1984, abandoned.

[51] Int. Cl.$^3$ ................................................. C08K 5/16
[52] U.S. Cl. ..................... 524/88; 524/239; 524/240; 524/242; 524/285; 524/288; 524/605
[58] Field of Search ............... 524/88, 605, 285, 288, 524/239, 240, 242; 528/308.1, 288, 292, 295

[56] References Cited

U.S. PATENT DOCUMENTS

| | | | |
|---|---|---|---|
| 4,000,158 | 12/1976 | Tobel | 524/88 |
| 4,051,178 | 9/1977 | Kimura et al. | 562/416 |
| 4,359,570 | 11/1982 | Davis et al. | 524/89 |

*Primary Examiner*—Lewis T. Jacobs
*Attorney, Agent, or Firm*—Clyde L. Tootle; Gary C. Bailey; J. Frederick Thomsen

[57] ABSTRACT

Colored polyester compositions suitable for formulation into sheets, films, fibers and containers comprising linear thermoplastic polyesters derived from a diol and unpurified terephthalic acid, and containing a color-forming component. The diol can be one or more diols wherein at least a major portion of which is ethylene glycol. The color-forming component can be one or more colorants compatible with the polyester including certain copolymerizable anthraquinone dyes, such as 1,5-bis(2-carboxyphenylthio)anthraquinone and/or 1,5-bis(o-carboxyanilino)anthraquinone.

9 Claims, No Drawings

COLORED POLYESTER COMPOSITIONS

DESCRIPTION

This is a continuation-in-part application of Ser. No. 575,242, filed Jan. 30, 1984, now abandoned.

BACKGROUND OF THE INVENTION

This invention relates to colored polyester compositions and more particularly to colored polyester compositions derived from unpurified or crude terephthalic acid and a diol and containing a color-forming component.

It is known that linear thermoplastic polyester material such as polyethylene terephthalate can be prepared by direct esterification of terephthalic acid with a diol as well as by ester interchange of dimethylterephthalate with a diol. Preparation of polyester material by these two routes, however, is not without disadvantages. By the ester interchange route terephthalic acid must first be esterified to dialkylphthalates with alkyl alcohols and then subjected to the ester interchange reaction with an appropriate diol. The preparation of commercially acceptable polyester from terephthalic acid has generally required that terephthalic acid be of exceptionally high purity.

However, terephthalic acid produced by a common method, for example, by the oxidation of p-xylene with an oxygen containing gas (e.g., air) in the presence of a heavy metal oxidation catalyst, such as cobalt or manganese, as shown in U.S. Pat. No. 2,833,816 (1958), contains unacceptable levels of by-products and impurities, for example, 4-carboxybenzaldehyde, p-toluic acid and catalyst metal residue, which can interfere with attaining the desired properties in the polyester material. Because of the high levels of impurities resulting from such oxidation processes, extensive purification methods have been developed in an attempt to reduce their presence so as to attain the high quality terephthalic acid needed in the production of commercially suitable polyester material. (See, for example, U.S. Pat. Nos. 4,051,178; 3,657,330, 3,626,001; and 3,592,847.)

A commercially acceptable polyester material which can be produced from terephthalic acid without first subjecting it to extensive purification procedures would, therefore, be highly desirable.

A polyester composition has now been found which can be produced from unpurified terephthalic acid. The polyesters of this invention are colored linear thermoplastic polyesters which can be formulated into various articles, for example, films, sheets and hollow structures such as colored beverage bottles. Surprisingly, articles formulated of the polyester compositions derived from crude terephthalic acid exhibit good clarity and brightness, two properties which commercial standards generally require of polyester material used in articles such as colored beverage bottles. The polyester compositions of this invention are also advantageous in that reduced amounts of colorant are required for polyesters of selected colors as compared to polyesters of the same color which have been produced from purified terephthalic acid or dimethylterephthalate. In addition, the colored polyesters of the present invention can be produced more economically since the terephthalic acid need not first be purified or converted to a corresponding dialkyl ester as generally required heretofore, thus resulting in a reduction in production time, equipment and reagents.

SUMMARY OF THE INVENTION

The present invention concerns colored linear thermoplastic polyester compositions derived from a diol wherein at least a major portion of which is ethylene glycol and unpurified terephthalic acid and containing a color-forming component. The unpurified terephthalic acid contains a significant amount of at least one impurity selected from the group consisting of 4-carboxybenzaldehyde, p-toluic acid, and one or more heavy metals as catalyst residue, and wherein at least one of the impurities is a color-forming impurity. The color-forming component further comprises a coloring amount of one or more colorants compatible with the polyester.

DETAILED DESCRIPTION OF THE INVENTION

The invention described herein relates to colored polyester compositions. In addition, this invention relates to articles formulated from the colored polyester compositions described herein, such as sheets, films and containers, all of which have wide commercial applications including, for example, the packaging of food, beverages and pharmaceuticals.

The diol component comprises one or more diols wherein at least a major portion of which is ethylene glycol. The term "major portion" is intended to mean that greater than about 50 mole percent and preferably greater than about 85 mole percent, based on the total amount of diol present, of ethylene glycol is employed. Thus, other known polyester-forming diols may be employed in amounts less than about 50 mole percent and preferably less than about 15 mole percent. Examples of additional diols include diethylene glycol; 1,4-cyclohexanedimethanol; propylene glycol; 1,4-butanediol; 2,2,4-trimethyl-1,3-pentantediol; 2,2-dimethyl-1,3-propanediol, etc. The diols preferred in addition to ethylene glycol are diethylene glycol and 1,4-cyclohexanedimethanol.

The polyester compositions of this invention further comprise the diacid terephthalic acid, which, as employed in the polyester compositions described herein, is unpurified. As used herein, the term "unpurified terephthalic acid" (hereinafter abbreviated and identified as crude TPA) is intended to mean terephthalic acid which contains a significant amount of at least one impurity of a group consisting of 4-carboxybenzaldehyde, p-toluic acid, and of one or more heavy metals as catalyst residue. Examples of such heavy metals include cobalt, manganese, etc. It should be noted that at least one of the impurities is a color-forming impurity. It is of course recognized that impurities in addition to those described herein may be present. The actual impurities and amounts thereof contained in crude TPA may vary depending on the particular process conditions used to prepare the crude TPA. The term "significant amount" as used herein is intended to mean the amount of each of one or more impurities previously considered in the prior art to be unacceptable for preparing commercially acceptable polyester. For crude TPA which has been produced by oxidation of p-xylene, either with air or other oxygen-containing gas in the presence of a cobalt-containing catalyst, the amount of the abovedescribed impurities typically present is from about 1000 to about 10,000 parts of 4-carboxybenzaldehyde, from about 1,000 to about 10,000 parts of p-toluic acid, and from about 20 to about 300 parts of cobalt, all amounts being based on one million parts of acid. Known methods suitable for preparing crude TPA as employed in the polyesters of this invention are shown in U.S. Pat. Nos. 2,833,816 (1958), 3,240,803 (1966), and 3,562,318 (1971), the disclosures of which are hereby incorporated by reference.

In addition to crude TPA, minor amounts of one or more additional diacids may be employed in these polyesters. Other well known polyester-forming diacids include, for example, isophthalic acid, 1,4-cyclohexanedicarboxylic acid, linear lower alkyl dicarboxylic acids, including, for example, succinic, glutaric, adipic, sebacic, maleic, and fumaric acids. The term "minor amount" as used herein is intended to mean up to about 20 mole percent of one or more additional diacids based on a total acid content of 100 mole percent. Thus, the total crude TPA content will be at least 80 mole %.

The color-forming component of this invention comprises at least one or more known colorants compatible with terephthalic acid based polyester compositions. Particularly suited for the polyesters of the present invention are anthraquinone dye colorants having the general formula

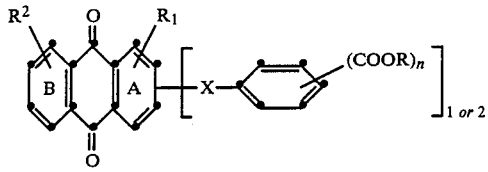

wherein either or both of rings A and B may contain in any position thereon one or two groups of the formula

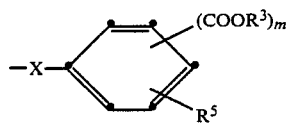

R and $R^3$ each is hydrogen, lower alkyl or hydroxy substituted lower alkyl; $R^1$, $R^2$, $R^4$ and $R^5$ each represents hydrogen or 1-3 substituents selected from lower alkyl, lower alkyl substituted with lower alkoxy, phenyl, Cl, Br, or lower alkanoylamino, lower alkoxy, lower alkoxy substituted with lower alkoxy, phenyl, Cl, Br, or lower alkanoylamino, chlorine, bromine, amino, lower alkylamino, lower alkylamino substituted with lower alkoxy, cyclohexyl, phenyl, Cl, Br, or lower alkanoylamino, arylamino, arylthio, aroylamino, lower alkylsulfonyl, lower alkylthio, lower alkanoylamino, and cyclohexylamino, wherein each aforesaid aryl moiety is 6-10 carbons; X is —S— or —NH—; n is 1 or 2; and m is 0, 1, or 2. The term "lower" as used herein means 1-6 carbon atoms. Dye colorants of this type are shown in U.S. Pat. No. 4,359,570 (1982), wherein a detailed description of which is provided and which is hereby incorporated by reference. Colors of various shade and intensity can be obtained by mixing these dyes as well as by mixing therewith other colorants such as carbon black, copper phthalocyanine and $TiO_2$.

The amount of colorant which may be employed can vary widely depending on the specific shade and intensity of color desired. Dye colorants such as the anthraquinone dyes shown in U.S. Pat. No. 4,359,570 can be employed in coloring amounts, for example, of from about 1.0 to about 5,000 parts of each dye per million parts of polyester, and preferably from about 2.0 to about 1500 parts per million. The colorants may be incorporated into the polyesters of this invention by methods known in the art (as shown in the above '570 patent), for example, by blending with the finished polymer melt as in Examples 1-3 disclosed herein or by adding at any stage of the esterification or polycondensation reaction, as in Examples 4-6 disclosed herein.

Preferred colored polyester compositions are amber and green polyethylene terephthalate prepared from crude TPA having at least one of the impurities previously described herein, ethylene glycol which may contain up to about 5 mole % diethylene glycol, and from 0 to about 30 mole % of 1,4-cyclohexanedimethanol, all based on a glycol content of 100 mole %, and containing from about 2.0 to about 1,500 parts of one or more of the anthraquinone dye colorants previously described hereinabove, said parts being based on one million parts of polyester. Particularly preferred colorants are yellow dye 1,5-bis(2-carboxyphenylthio)anthraquinone, red dye 1,5-bis(2-carboxyanilino)anthraquinone and blue pigment copper phthalocyanine, the anthraquinone dye colorants being contained in copolymerized form in amounts previously described herein.

Advantageously colored polyester compositions, derived from crude TPA and wherein the predominant colorant is yellow, as in the preferred green or amber-colored polyethylene terephthalate, can be attained with reduced amounts of added colorants as compared to a similarly colored polyester derived from pure TPA or from dimethylterephthalate. This is a result of the utilization of color-forming impurities such as 4-carboxybenzaldehyde contained in crude TPA.

Thus, the manufacture of articles such as amber-colored beverage bottles can be accomplished at an even greater reduced cost as a result of the need to use less colorant. It should be noted that the polyester compositions of this invention preferably have an I.V. of about 0.4 to about 0.8 when measured at 25° C. in a 60/40 by weight mixture of phenol/tetrachloroethane at a concentration of 0.5 g/100 ml.

The polyester compositions described herein can be produced by methods generally known in the art for producing polyesters, the process generally consisting of a two-stage reaction comprising the esterification of the acid and diol followed by polycondensing under reduced pressure until a polymer of desired I.V. is obtained. Temperatures suitable for forming the polyesters may range up to about 250° C., or higher so that the water produced by the esterification is continuously removed. The reaction may be conducted under an inert atmosphere. The esterification takes place almost quantitatively and can be followed by measuring the hydroxyl and acid numbers.

Conventional catalysts are employed in the preparation of these polyesters. For example, polycondensation can be effected in the presence of catalytic amounts of transition metal compounds, such as antimony acetate, antimony trioxide, and titanium alkoxides. The amount of catalyst employed ordinarily will be from about $10^{-5}$ to $10^{-3}$ moles per mole of total acid employed.

Various additives which do not adversely affect the polyesters described herein may also be incorporated into the polyester material. Some of these include antioxidant stabilizers, colorants, lubricants, mold releasing agents, etc., as well as various other additives all of which are well known in the art. For a more detailed description of the preparation of polyesters see Encyclopedia of Chemical Technology, Third Edition, Vol. 18, (1982) the disclosure of which is hereby incorporated by reference.

The polyester compositions of the present invention can be formulated into various articles by methods well known in the art. For example, they can be extruded by conventional techniques into sheets, films and the like as well as molded, for example, by compression molding and blow molding, into colored containers of good brightness and clarity, particularly green- or amber-colored beverage bottles.

Containers which are particularly preferred are biaxially oriented blow-molded containers which may be made according to techniques shown in U.S. Pat. No. 3,733,309.

The following examples are given to further illustrate the invention, but it is understood that the invention is not to be limited in any way by the details described therein.

EXAMPLE 1(a)

Poly(ethylene terephthalate) was prepared in a continuous polymerization reaction by reacting ethylene glycol and crude terephthalic acid containing 1.1% 4-carboxybenzaldehyde, 60 ppm Co, and 70 ppm Br. $Ti^{+4}$ (~100 ppm) was used as catalyst. A yellow polymer was obtained. This polymer was solid state polymerized to ~0.72 I.V., blended with concentrates of yellow dye, 1,5-bis(o-carboxyphenylthio)anthraquinone (450 ppm), red dye, 1,5-bis(o-carboxyaniline)anthraquinone (300 ppm), and blue pigment, copper phthalocyanine (75 ppm), extruded into parisons, and blown into two-liter bright amber bottles.

EXAMPLE 1(b)

The procedure in Example 1(a) was repeated substituting dimethyl terephthalate for crude TPA and yellow dye, 1,5-bis(o-carboxyphenylthio)anthraquinone (1000 ppm), red dye, 1,5-bis(o-carboxyaniline)anthraquinone (300 ppm) and blue pigment, copper phthalocyanine (75 ppm), were blended with the solid state polymerized polymer. Two-liter bottles formulated from the polymer were a bright amber color. Comparison of the bottles obtained in Example 1(a) with those obtained in Example 1(b) showed that the crude TPA-derived bottles exhibited brightness and clarity comparable to the DMT-derived bottles.

EXAMPLE 2

Poly(ethylene terephthalate) was prepared in a continuous polymerization reaction from ethylene glycol and crude terephthalic acid containing 0.4% 4-carboxybenzaldehyde and 30 ppm Co. $Ti^{+4}$ (~100/ppm) was used as catalyst. A yellow polymer was obtained. This polymer was solid state polymerized to ~0.72 I.V., blended with concentrates of yellow dye, 1,5-bis(o-carboxyphenylthio)anthraquinone (900 ppm), red dye, 1,5-bis(o-carboxyaniline)anthraquinone (300 ppm), and blue pigment, copper phthalocyanine (65 ppm), extruded into parisons, and blown into two-liter bottles. The color of the bottles and their appearance, especially in relationship to brightness, were comparable to bright amber poly(ethylene terephthalate) prepared in Example 1(b).

EXAMPLE 3

Poly(ethylene terephthalate) was prepared in a continuous polymerization reaction from ethylene glycol and crude TPA containing 0.4% 4-carboxylbenzaldehyde and 30 ppm Co. $Sb^{+3}$ (~250 ppm) was used as catalyst. This polymer was solid stated to ~0.72 I.V., blended with concentrates of yellow dye, 1,5-bis(o-carboxyphenylthio)anthraquinone (300 ppm) and blue pigment, copper phthalocyanine (90 ppm), molded into parisons, and blown into two-liter bottles. The color of the bottle and its appearance, especially in relationship to brightness, were comparble to bright green poly(ethylene terephthalate) prepared from dimethyl terephthalate and ethylene glycol with 300 ppm yellow dye and 90 ppm blue pigment.

EXAMPLE 4

Poly(ethylene terephthalate) was prepared in a continuous polymerization reaction from ethylene glycol and crude TPA containing 0.98% 4-carboxybenzaldehyde and 51 ppm Co. The catalyst used was Ti (~60 ppm), Sb (~200 ppm), and P (~40 ppm). Yellow dye, 1,5-bis(o-carboxyphenylthio)anthraquinone (~1000 ppm), red dye, 1,5-bis(o-carboxyanilne)anthraquinone (~360 ppm), and blue pigment, copper phthalocyanine (~65 ppm) were added at the beginning of the melt phase polymerization reaction. The resulting polymer was solid stated to ~0.72 I.V., molded into parisons, and blown into two-liter bottles. The color of the bottle and its appearance, especially in relationship to brightness, were comparable to bright amber poly(ethylene terephthalate) prepared from dimethyl terephthalate and ethylene glycol with a similar concentration of colorants.

EXAMPLE 5

Poly(ethylene terephthalate) containing 3.5 mole % (based on total diol content) of 1,4-cyclohexanedimethanol was prepared in a continuous polymerization reaction from ethylene glycol, 1,4-cyclohexanedimethanol, and crude TPA containing 0.98% 4-carboxybenzaldehyde and 51 ppm Co. The catalyst components and colorants were the same as outlined in Example 4, the colorants again being added at the beginning of the melt phase polymerization reaction. The polymer obtained was solid stated to ~0.72 I.V., molded into parisons, and blown into two-liter bottles. The color of the bottles and their appearance, especially in relationship to brightness, were comparable to a bright amber poly(ethylene terephthalate) prepared from dimethyl terephthalate, ethylene glycol, and 1,4-cyclohexanedimethanol.

EXAMPLE 6

Poly(ethylene terephthalate) was prepared in a continuous polymerization reaction from ethylene glycol and a 50/50 mixture of two crude TPA samples, one containing 0.40% 4-carboxybenzaldehyde and 35 ppm Co and the other containing 0.50% 4-carboxybenzaldehyde and 200 ppm Co. The catalyst system was Ti (~60 ppm), Sb (~230 ppm) and P (~45 ppm). Yellow dye, 1,5-bis(o-carboxyphenylthio)anthraquinone (~300 ppm) and blue pigment, copper phthalocyanine (~75 ppm), were introduced at the beginning of the melt phase polymerization reaction. The polymer obtained was solid state polymerized to ~0.72 I.V., molded into parisons, and blown into two-liter bottles. The color of the bottles and their appearance, especially in relationship to brightness, were comparable to bright green poly(ethylene terephthalate) prepared from dimethyl terephthalate and ethylene glycol with ~300 ppm yellow dye and 90 ppm blue pigment.

The invention has been described in detail with particular reference to preferred embodiments thereof, but it will be understood that variations and modifications will be effected within the spirit and scope of the invention.

I claim:

1. Colored polyester compositions comprising: (1) a linear thermoplastic polyester derived from
   (a) a diol, wherein at least a major portion of which is ethylene glycol, and
   (b) crude terephthalic acid containing at least one impurity selected from the group consisting of about 1,000 to about 10,000 parts 4-carboxybenzaldehyde, about 1,000 to about 10,000 parts p-toluic acid, about 0 to about 11,000 parts benzoic acid, and about 20 to about 300 parts cobalt, said parts being per million parts of polyester, wherein at least one of said impurities is a color-forming impurity, and (2) a color-forming component comprising a coloring amount of one or more colorants compatible with said polyester.

2. The composition of claim 1 wherein the color-forming component is one or more dyes of the formula

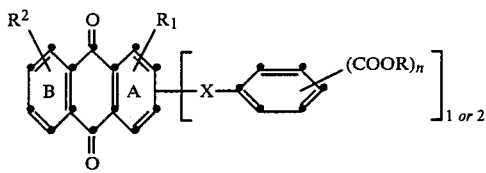

wherein either or both of rings A and B may contain in any position thereon one or two groups of the formula

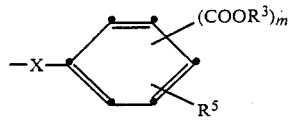

R and $R^3$ each is hydrogen, lower alkyl or hydroxy substituted lower alkyl; $R^1$, $R^2$, $R^4$ and $R^5$ each represents hydrogen or 1–3 substituents selected from lower alkyl, lower alkyl substituted with lower alkoxy, phenyl, Cl, Br, or lower alkanoylamino, lower alkoxy, lower alkoxy substituted with lower alkoxy, phenyl, Cl, Br, or lower alkanoylamino, chlorine, bromine, amino, lower alkylamino, lower alkylamino substituted with lower alkoxy, cyclohexyl, phenyl, Cl, Br, or lower alkanoylamino, arylamino, arylthio, aroylamino, lower alkylsulfonyl, lower alkylthio, lower alkanoylamino, and cyclohexylamino, wherein each aforesaid aryl moiety is 6–10 carbons; X is —S— or —NH—; n is 1 or 2; m is 0, 1, or 2; and from about 5 to about 200 parts of copper phthalocyanine admixed therewith, said parts being per million parts of poyester.

3. The composition of claim 1 wherein the color-forming component is 1,5-bis(2-carboxyphenylthio)anthraquinone or 1,5-bis(o-carboxyanilino)anthraquinone or mixtures thereof, each being present in a concentration of from about 1.0 parts per million to about 3.0 percent by weight of the polyester, and from about 5 to about 200 parts of copper phthalocyanine admixed therewith, said parts being per million parts of polyester.

4. The composition of claim 1 wherein said diol comprises ethylene glycol, and 1,4-cyclohexandimethanol, 1,4-butanediol or diethylene glycol or mixtures thereof.

5. The composition of claim 3 wherein the diol comprises ethylene glycol and, from 0 to about 30 mole % of 1,4-cyclohexanedimethanol, and up to about 5 mole % of diethylene glycol, based on a diol content of 100 mole %, and wherein each dye is present in reacted form in a concentration of from about 2.0 to about 1500 parts per million parts of polyester.

6. A molded article of manufacture produced from the polyester composition of claim 1.

7. An extrusion blow molded hollow structure produced from the polyester composition of claim 1.

8. A film produced from the polyester composition of claim 1.

9. An extrusion blow molded hollow structure produced from the polyester composition of claim 5.

* * * * *